3,565,842
RUBBER-ASPHALT EMULSIONS
Armin C. Pitchford, Bartlesville, Okla., assignor to Phillips Petroleum Company, a corporation of Delaware
No Drawing. Continuation-in-part of application Ser. No. 474,474, July 23, 1965. This application June 12, 1968, Ser. No. 736,257
Int. Cl. C08c *11/68;* C08f *47/18*
U.S. Cl. 260—28.5
9 Claims

ABSTRACT OF THE DISCLOSURE

A stable cationic rubber-asphalt emulsion is made by blending a rubbery block copolymer of at least one conjugated diene and at least one monovinyl or divinyl aromatic compound with asphalt, water and an emulsifying amount of a cationic emulsifying agent.

---

This application is a continuation-in-part of application Ser. No. 474,474, now abandoned, filed July 23, 1965.

This invention relates to a cationic asphalt emulsion. In another aspect it relates to improving the performance of the asphalt employed in the preparation of the cationic emulsion by the inclusion of rubber that is homogeneously dispersed throughout the asphalt emulsion.

The use of asphalt emulsions in the construction and repair of roads, pavements, soil stabilization, and the like, has become increasingly important since the end of World War II. Cationic emulsifiers in particular are more versatile as compared to anionic emulsifiers since they result in an asphalt emulsion that can be worked satisfactorily with a broader range of aggregates, especially those which contain varying amounts of silica.

The probable reason for their superiority is that silica-containing aggregates carry a negative charge and cationic emulsions which are positively charged are readily attracted thereto and readily become bound to these aggregate surfaces. In addition, the combination of a small percentage of a mineral acid or organic acid into the emulsion results in the formation of an acid addition product which activates the emulsifier and promotes a stable emulsion.

These cationic asphalt emulsions are known to the prior art and it is known to blend rubber with anionic emulsions in order to impart improvement in properties such as elasticity and ductility of the asphalt remaining after the emulsion has cured.

One of the first known methods of incorporating rubber with asphalt consisted of mixing the asphalt with a rubber latex. As long as the asphalt emulsions are anionic, this method presented no problem for the reason that emulsion polymerization of butadiene and styrene to form synthetic rubber is carried out in an anionic system. This results in a rubber latex that is compatible with the anionic asphalt emulsion.

However, this rubber latex could not be uniformly dispersed in a cationic asphalt emulsion in such a manner. The main problem with attempting to disperse the anionic latex into a cationic asphalt emulsion is that the excess acid readily neutralizes the anionic rubber latex which causes creaming of both the latex and asphalt. Similarly, dispersion of conventional rubber in asphalt prior to emulsification produces a rubberized product having a viscosity too high to permit emulsification with conventional equipment and techniques, thereby making it extremely difficult to produce a cationic rubberized asphalt emulsion.

It is, therefore, an object of this invention to provide a novel method for homogeneously dispersing rubber in a cationic asphalt emulsion.

It is another object of this invention to provide a novel, stable, cationic asphalt-rubber emulsion possessing improved rheological properties.

Further objects and advantages of this invention will become apparent to those skilled in the art from the following description and accompanying claims.

In a copending application, Ser. No. 474,465, filed July 26, 1965, now abandoned (assigned to a common assignee, Phillips Petroleum Company of Bartlesville, Okla.), there is described a method for preparing rubber-asphalt blends wherein the rubber is homogeneously dispersed throughout the asphalt.

Broadly speaking, I have discovered that the lower viscosity and greater homogeneity of these asphalt-rubber blends permit their use in the preparation of stable cationic asphalt-rubber emulsions which are useful in road construction with electronegative aggregates such as silica, quartz, or river sand. The rubber employed is a block copolymer of conjugated dienes having 4–12 carbon atoms and vinyl aromatic compounds, preferably a copolymer of butadiene and styrene and is prepared according to the method disclosed in application Ser. No. 721,293, filed Mar. 13, 1958, now abandoned.

The block copolymers prepared according to the above-identified method are to be distinguished from random copolymers in that the final product is made up of blocks or segments which are dissimilar and said segments are joined in an end-to-end arrangement through a primary chemical bond. The block copolymer made from monomer mixtures by this aforementioned method has two distinct polymeric blocks. One of the blocks forming the polymer chain is a random copolymer of a conjugated diene and a vinyl-substituted aromatic hydrocarbon while another block is a homopolymer of a vinyl-substituted aromatic hydrocarbon. The copolymer block generally contains only a small amount of the vinyl-substituted aromatic compound such as styrene; for example, less than 10 weight percent. When utilizing as the charge to the polymerization zone a mixture of 75 parts by weight butadiene and 25 parts by weight styrene, it has been found that the copolymer block contains from 5 to 7 percent styrene.

The block copolymers suitable for use according to this invention can also contain two dissimilar polymeric blocks or segments wherein each of said segments is a sequence of units of a single monomer, i.e., each polymer segment is a homopolymer such as will be made by sequence monomer addition instead of from the monomer mixture, and the homopolymer vinyl substituted aromatic segment comprises at least 5 percent by weight of the total block copolymer.

A block copolymer of 1,3-butadiene with styrene was prepared in accordance with the following recipe:

| | |
|---|---|
| Butadiene, parts by weight | 75 |
| Styrene, parts by weight | 25 |
| n-Hexane, parts by weight | 700 |
| n-Butyllithium, parts by weight | 0.177 |
| Reaction time, min. (average) | 25 |
| Initiation temp., °F. (average) | 125 |
| Peak temp., °F. (average) | 231 |
| Pressure, p.s.i.g. (initial) | 15 |
| Polystyrene by oxidative degradation, parts by weight | 18.7 |
| Total bound styrene, parts by weight | 24.9 |

At the end of the reaction period shortstopping was effected with 0.75 part of mixed $C_{16}$–$C_{18}$ saturated and unsaturated fatty acids per 100 parts of monomers (p.h.m.), and 1 p.h.m. of 2,6-di-tert-butyl-4-methylphenol was added as antioxidant. The polymer was steam-stripped and dried in an apron dryer. The finished polymer had a Mooney viscosity (ASTM D 1646–63, large rotor, 4 minutes, 212° F.) of 47.

The 18.7 parts by weight polystyrene obtained by oxidative degradation represents the styrene in polystyrene blocks. The method is based upon the principle that polymer molecules containing ethylenic bonds, when dissolved in p-dichlorobenzene and toluene, can be broken into fragments by reaction with tert-butyl hydroperoxide catalyzed with osmium tetroxide. Saturated polymer molecules or molecular fragments such as polystyrene or the polystyrene fragments from the random copolymer block enic bonds remain unattacked. The small fragments (low molecular weight aldehydes) and the low molecular weight polystyrene fragments from ther andom copolymer block are soluble in ethyl alcohol whereas the unattacked high molecular weight polystyrene from the styrene homopolymer block is insoluble in ethyl alcohol. It is thus possible to effect a separation of the high molecular weight polystyrene which constitutes the homopolymer block of the block copolymer. Following is a general description of the method used for this determination.

Approximately 0.5 gram of the polymer prepared as hereinbefore described was cut into small pieces, weighed to within 1 milligram, and charged to a 125 ml. flask. Forty to fifty grams of p-dichlorobenzene was then charged to the flask and the contents were heated to 265° F. The temperature was maintained at this level until the polymer dissolved. The solution was then cooled to 175 to 195° F. and 8.4 ml. of a 71.3 percent by weight aqueous solution of tert-butyl hydroperoxide was added. One milliliter of 0.003 molar osmium tetroxide in toluene was then added to the flask contents and the resulting solution was heated to between 230 and 340° F. for 10 minutes. The solution was then cooled to between 120 and 140° F. after which 20 ml. of toluene was added and the solution was poured slowly into 250 ml. of ethyl alcohol containing a few drops of concentrated sulfuric acid. Polystyrene coagulated and was recovered, dried, and weighed to find percent polystyrene in the blocks.

Examples of preferred conjugated dienes are 1,3-butadiene, 2-methyl-1,3-butadiene and 1,3-pentadiene.

Examples of suitable vinyl-substituted aromatic hydrocarbons include styrene, divinylbenzene, 3-vinyltoluene, 1-vinylnaphthalene, 2-vinylnaphthalene, 3-methylstyrene, and the like. It is also preferred that the two monomers be utilized in a weight ratio of 5:95 to 95:5 in the practice of this invention in order to produce a copolymer. It is to be understood that within the concept of this invention that one of the blocks of the block copolymer is a polymer of a vinyl-substituted aromatic compound (for example, polystyrene) which comprises at least 5 percent by weight of the total block copolymer.

These copolymers are rubbery polymers. The term rubbery polymer includes elastomeric vulcanizable polymeric material which after vulcanization, i.e., crosslinking, possesses the properties normally associated with vulcanized rubber, including materials which when compounded and cured exhibit extensibility at 80° F. over 100 percent of a specimen's original length with a retraction of at least 90 percent within 1 minute after release of the stress necessary to elongate to 100 percent.

The amount of copolymer used in the rubber-asphalt blend can range from 0.1 to 15 weight percent of the rubber-asphalt blend, and preferably from 0.1 to 7.5 weight percent.

Asphalts useful in the practice of this invention are those which are conventionally graded according to penetration values at 77° F. as measured by the Standard Method of Test for Penetration of Bituminous Materials (ASTM D-5-61), the penetration values being determined as the tenths of a millimeter that a tapered standard needle (0.14-0.16 mm. tipped diameter) will penetrate the asphalt at a temperature of 77° F. in 5 seconds with a 100 g. load. These asphalts have penetrations ranging from 0 to above 300, preferably 40 to 300. These asphalts also possess softening points, as measured by the Standard Method of Test for Softening Points of Bituminous Materials (ASTM D-36-62T), in the range of 90-250° F., preferably 100-150° F.

This invention is also applicable to that class of asphalts known as "air blown" asphalts. These blown asphalts normally do not have an affinity for or capacity to absorb the rubber and normally possess chemical characteristics or molecular structures which are considerably different from those of the cracked, straight-run or vacuum-reduced asphalts, which have been described hereinabove. The blowing operation by which such blown asphalts are produced involves heating an asphalt, usually as an asphalt flux, to a temperature of about 400-450° F. and oxidizing the mass by blowing air therethrough. A catalyst, such as phosphorus pentoxide, can be used if desired.

The result of this oxidation is a change in the nature of the entire mass and the purpose is normally that of producing a harder asphalt of higher softening point, usually on the order of 170° F. or higher. Other physical and chemical characteristics of the asphalt which have generally been changed by this blowing operation include the development of greater resistance to flow and to weathering. However, it has also been found that the resultant blown asphalts are less compatible with various rubbers with which it has been attempted to blend them heretofore.

The novel rubber-asphalt cationic emulsions of this invention can be made by means normally used for the preparation of asphalt emulsions. One such means involves preparing a soap solution comprising water (either soft or hard) and a cationic emulsifying agent. The asphalt-rubber blend is heated to 150–350° F., preferably 250–300° F., and added slowly to the soap solution, which is at a temperature of 90–200° F., preferably 90–125° F. and is circulating through a colloid mill. After the addition of the asphalt-rubber blend is complete, milling is continued for 3–4 minutes at 150–200° F., with a stator-rotor spacing of 0.004 or 0.005 inch. After milling, the emulsion is stored in capped containers at room temperature for a minimum of 24 hours prior to testing.

It is to be understood that within the concepts of this invention that the asphalt emulsion can be produced without previously forming a latex of the rubber, i.e., the rubber can be blended directly with the asphalt and the resultant blend mixed with water, emulsifying agent, etc., to produce said asphalt emulsion.

In preparing these cationic asphalt emulsions, usually an acid is used in making up the soap solution where it is necessary to activate the emulsifying agent, such as the diamine type of cationic emulsifying agent. Representative acids which can be used for this purpose include hydrochloric acid, sulfuric acid, acetic acid, sulfamic acid ($NH_2SO_3H$), etc., wherein a sufficient amount of the acid is employed to impart a pH value of less than 7 to the emulsion, which amount will generally be about 0.05 to 1, preferably about 0.2 to 1, weight percent of the emulsion, although the amount of acid used can be considered and calculated as part of the emulsifying agent. Alkaline cationic asphalt emulsions can be prepared where the cationic emulsifying agent used is a quaternary ammonium compound, by adding to the soap solution a base such as alkali metal or alkaline earth metal oxide or hydroxide, such as potassium hydroxide, sodium hydroxide, calcium hydroxide, calcium oxide and barium oxide. The amount of base employed in making such alkaline cationic asphalt emulsions usually will be that sufficient to impart a pH value of 7.5 to 11, preferably 8 to 10.5, which amount will generally be less than 1 weight percent of the emulsion. In some instances it may be desirable to improve the modified miscibility and cure of slurries of the cationic asphalt emulsion by incorporating into the latter a petroleum naphtha, e.g., one which boils in the range of 120 to 400° F., which naphtha can be added, for example, to the emulsified asphalt, particularly after it is discharged from the colloid mill. The amount of such naphtha used can be 1 ot 5, preferably 1.2 to 3.5, weight percent of the emulsion.

The cationic emulsifying agents which can be used in the practice of this invention are salts of organic nitrogen bases characterized by the presence of at least one basic nitrogen atom in their cation portion, and where the latter contains a long-chain aliphatic hydrocarbon radical of at least 12 and as many as 24 carbon atoms, preferably a straight chain fatty aliphatic group. A particularly useful subclass of such cationic emulsifying agents are the tetra-substituted quaternary ammonium compounds, such as those of the general formula:

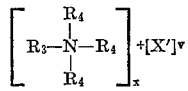

where $R_3$ is a long alkyl chain of at least 12 and as many as 24 carbon atoms, and the $R_4$'s are shorter alkyl radicals or benzyl radicals, the presence of which is sufficient to impart oil solubility and emulsifying properties to the salt material, $X'$ is a hydroxyl or an anion such as nitrate, sulfate, secondary phosphate, acetate, benzoate, salicylate and preferably a halogen, such as chlorine or bromine, $v$ is the valence of said hydroxyl or anion, and $x$ is an integer equal to said valence. Another particularly useful subclass of cationic emulsifying agents are the salts of heterocyclic nitrogen bases, such as alkyl pyridine, alkyl quinoline, alkylisoquinoline and alkyl imidazoline, a particularly useful group of the latter represented by the general formula:

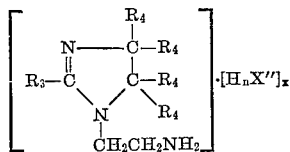

where $R_3$ is an aliphatic radical selected from the group consisting of alkyl and alkenyl radicals, preferably having 12 to 24 carbon atoms, $R_4$ is selected from the group consisting of hydrogen and alkyl radicals preferably having 1 to 4 carbon atoms, and $X''$ is an anion such as nitrate, sulfate, secondary phosphate, acetate, benzoate, salicylate and preferably a halogen, such as chlorine and bromine, $n$ is an integer equal to the valence of said anion, and $x$ is an integer of 1 to 3. Primary, secondary and tertiary monoamines and diamines are also useful in this invention, particularly the fatty acid diamines of the general formula $R_3NH(CH_2)_mNH_2$, where $R_3$ is as defined above and $m$ is an integer in the range of 1 to 3.

Another particularly useful subclass of cationic emulsifying agents are those of the general formula:

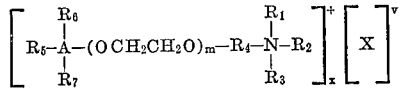

where $R_1$ and $R_2$ are lower alkyl hydrocarbon radicals having, for example, 1 to 4 carbon atoms, such as methyl, ethyl, propyl (preferably methyl), $R_3$ is also such an alkyl radical (preferably methyl) or a aryl, alkaryl or aralkyl hydrocarbon radical having, for example, 6 to 7 carbon atoms, such as phenyl, benzyl or tolyl, $R_4$ is a lower alkylene hydrocarbon radical having, for example, 1 to 2 carbon atoms, such as methylene and ethylene, $R_5$ is a long chain alkyl hydrocarbon radical having, for example, 8 to 25, preferabl 8 to 20, carbon atoms, such as octyl, dodecyl, pentadecyl, icosyl and pentacosyl, $R_6$ and $R_7$ are hydrogen atoms or lower alkyl radicals having, for example, 1 to 5 carbon atoms, A is a benzene nucleus, X is a hydroxyl or a salt-forming anion such as nitrate, sulfate, secondary phosphate, acetate, benzoate, salicylate and preferably a halogen, such as chlorine or bromine, $n$ is an integer equal to 0 or 1, $v$ is the valence of said hydroxyl or anion, and $x$ is an integer equal to said valence. These cationic emulsifying agents are quaternary ammonium compounds, and we prefer to use those which are chloride salts and where the sum of carbon atoms in $R_1$, $R_2$ and $R_3$ does not exceed 12 and the sum of carbon atoms in $R_6$ and $R_7$ does not exceed 6.

Representative cationic emulsifying agents which can be used in this invention include cetyltrimethylammonium bromide, cetyldimethylethylammonium bromide, "tallow" trimethylammonium chloride (the term "tallow" referring to the radical of a mixture of fatty acids derived from tallow), n-dodecyltrimethylammonium chloride,
n-dodecyltrimethylammonium bromide,
n-dodecyltrimethylammonium hydroxide,
n-tetradecyltrimethylammonium chloride,
n-hexadecyltripropylammonium iodide,
n-octadecyltri-n-butylammonium nitrate,
n-octadecyltriethylammonium chloride,
n-hexadecyltrimethylammonium chloride,
n-eicosyltrimethylammonium chloride,
n-tetracosyltrimethylammonium acetate,
n-pentadecylethyldimethylammonium chloride,
n-docosylpropyldimethylammonium chloride,
n-tricosyl-n-decyldiethylammonium benzoate,
n-tetradecyl-n-heptyldimethylammonium chloride,
n-octadecyl-n-decyldimethylammonium chloride,
n-heptadecyldipropylmethylammonium chloride,
n-nonadecyldi-n-octylmethylammonium chloride,
n-hexadecylethyldimethylammonium chloride,
n-dodecylbenzyldimethylammonium chloride,
n-pentadecylbenzyldiethylammonium fluoride,
n-octadecylpropyldimethylammonium salicylate,
n-dodecyl-n-butylbenzylmethylammonium bromide,
n-nonadecyldiethylmethylammonium sulfate,
n-eicosyltrimethylammonium orthophosphate,
1-(2-aminoethyl)-2-(4-tetrarecenyl)-4,5-di-n-butyl-2-imidazoline,
1-(2-aminoethyl)-2(1,1-diethyl-5,7-dodecadienyl)-4,5-dimethyl-2-imidazoline,
1-(2-aminoethyl)-2-n-octadecyl-4-ethyl-2-imidazoline,
1-(2-aminoethyl)-2-n-eicosyl-2-imidazoline,
1-(2-aminoethyl)-2-(1,1-dimethyldecyl)-2-imidazoline,
1-(2-aminoethyl)-2-(12-heptadecenyl)-2-imidazoline,
and 1-(2-aminoethyl)-2-(5,7-heptadecadienyl)-2-imidazoline,
p-n-octylbenzyldimethylphenylammonium chloride,
p-diisobutylbenzyltrimethylammonium chloride,
4-n-nonyl-3,5-dimethylbenzyldiethylbenzylammonium chloride,
2-n-dodecyl-3-methyl-5-isopentylphenylethylmethyl-n-butyltolylammonium chloride,
4-(5,6-dimethyl)pentadecyl-3,5-diethylphenylethyl-methylethylphenylammonium chloride,
3-methyl-4-n-eicosyl-5-ethylbenzyltriethylammonium chloride,
3,5-di-n-pentacosylphenylethyl-di-n-pentyltolylammonium chloride,
p-n-octylphenoxyethoxyethyltrimethylammonium chloride,
p-(3-methyldodecyl)benzyltrimethylammonium chloride,
p-diisobutylphenoxyethoxyethyldimethylbenzylammonium chloride,
3,5-dimethyl-4-n-octylphenoxyethoxyethyldiethylphenylammonium chloride,
2-(3,4,5-triethyl)tetradecyl-3,4-diisopropylphenoxyethoxyethylmethyl-n-butyltolylammonium chloride,
p-diisobutylcresoxyethoxyethyltrimethylammonium chloride,
3-methyl-5-n-pentyl-4-n-eicosylphenoxyethoxyethyl-di-n-butylphenylammonium chloride,
2-methyl-6-n-amyl-4-n-pentacosylphenoxyethoxyethyl-di-n-amyl-tolylammonium chloride, and the like, including mixtures thereof, and the corresponding hydroxides, nitrates, sulfates, phosphates, acetates, benzoates, salicylates, and bromides.

There are a number of commercially available cationic emulsifying agents which can be used in this invention, including (identifed by tradename and by chemical composition): Nalcamine CAE (the preferred cationic emulsifying agent of this invention), which is a mixture of 1-(2-aminoethyl)-2-n-aliphatic-2-imidazolines where the aliphatic groups are heptadecenyl and heptadecadienyl; Hyamine 1622, octylphenoxyethoxyethyldimethylbenzylammonium chloride; Hyamine 2389, methylodecylbenzyltrimethylammonium chloride; Nalquate G–8–12, 1-(2-oxyethyl)-2-n-alkyl-1 (or 3)-benzyl-2-imidazolinium chlorides; Diam 11-C (n-alkyl-1,3-propylene amines); Aliquat 26, monotallowtrimethylammonium chloride; Alamine 26, primary tallow amine; Duomeen T, N-alkyltrimethylenediamine; and the like.

The relative amounts of the various components of the rubber asphalt emulsions of this invention can vary. Generally, the rubber asphalt blend will be 50 to 75, preferably 60 to 68, weight percent, the water will be 25 to 50, preferably 31 to 39, weight percent, and the cationic emulsifying agent will be at least about 0.25, usually 0.5 to 3.5, and preferably 0.9 to 2.5, weight percent, based on the total weight of the emulsion.

The asphalt rubber emulsions of this invention can be applied in paving, resurfacing, coating, etc., and will produce good uniform and smooth coatings. The emulsions can be mixed with aggregate, for example in the ratio of 0.5–5 parts emulsion to 4–10 parts aggregate, and the resulting slurry applied to the surface to be treated. After such application, the slurry sets up in the usual manner to provide an adhering coating. The aggregate to be used has a moisture content in the range of 5 to 20 weight percent, and dry aggregate can be prewet to provide this moisture content. The electronegative aggregates, such as gravel, sand, and other siliceous materials, are preferred in preparing slurries of the same with these cationic rubber asphalt emulsions. In the "slurry seal" technique, moist sand can be mixed with the asphalt emulsion to form a slurry of a consistency similar to that of a portland cement mix. This slurry can be continuously dumped from a revolving drum mixer or other suitable mixing device onto a road surface, and as the paving vehicle proceeds along the road a rubber drag apron can be used to smooth the slurry to a uniform thickness. For this purpose, a graded sand aggregate containing more than 10 percent fines passing a 200 mesh sieve is preferred. For slow-setting emulsions, at least 1½ to 2 minutes will be usually required to mix the emulsion with the aggregate and spread the resulting slurry on the road surface before the emulsion breaks. In another application, the asphalt emulsion, sand, and portland cement or diatomaceous earth can be applied to surfaces as a mixture by the "gunnite" method, which is especially suited for coating canals, reservoirs, water ponds, dam facings, etc. Such application can be made with pneumatic-type spray equipment, such as a Refract-All Gun. Glass wool, rock wool, hemp, cotton, and other fibers can be added to the slurry or emulsion to provide coatings having higher tensile strength and which will not crack with shifting of the base or surface to which the coating is applied.

Further objects and advantages of this invention are illustrated in the following examples, but it should be understood that the various materials used and the amounts thereof, recited in these examples are illustrative of preferred embodiments only, and these examples should not be construed to unduly limit this invention.

EXAMPLE I

A stable emulsion of a blend of 98 weight percent of 85/100 penetration asphalt and 2 percent solution polymerized 75–25 butadiene-styrene block copolymer as described hereinabove, was heated to about 300° F. and added slowly to an acidified water solution of Nalcamine CAE cationic emulsifying agent in the charge tank of a Manton-Gaulin colloid mill. The following recipe was employed:

| | Parts by weight |
|---|---|
| Asphalt-rubber blend | 52.00 |
| Nalcamine CAE | 0.60 |
| HCl, anhydrous | 0.07 |
| Water | 47.33 |

The aqueous phase was recirculated through the mill. After the addition of the asphalt-rubber blend, the stator-rotor spacing was adjusted to 0.005 inch and milling was continued at 190–200° F. for 3–4 minutes. After standing 24 hours this emulsion was homogeneous with no indication of breaking. This rapid-setting cationic emulsion is normally used for chip sealing on road surfaces. In this process the emulsion is spread on the road and chat is then spread on the emulsion. An emulsion that breaks rapidly upon addition of the chat and attaches to the agglomerate is desired.

EXAMPLE II

An emulsion polymerized 75–25 butadiene-styrene random copolymer latex containing about 20 percent solids was added dropwise to 85/100 penetration asphalt cement which was stirred constantly during the entire operation. The polymer was identified as Philprene 1502 (a registered trademark), and was made by the recipe in ASTM D 1419–61T. Temperature was maintained at about 240–280° F. After the latex addition was complete, stirring was continued for about 30 minutes prior to evaluation. A solution polymerized 75–25 butadiene-styrene random copolymer solution containing about 12 percent solids was added to the same asphalt base stock used in the previous test. The polymer was identified as Solprene 1204 (a registered trademark), and was made by the process of U.S. 2,975,160. Final traces of the n-hexane solvent were removed by gas stripping using nitrogen as the inert gas. The rubber-containing blends and their properties are shown in the following tabulation:

| | 1 | 2 |
|---|---|---|
| Copolymer | Philprene 1502 | Solprene 1204 |
| Wt. percent solids in rubber | 18.0 | 12.3 |
| Wt. percent asphalt | 98.0 | 98.0 |
| Wt. percent copolymer added | 2.0 | 2.0 |
| Mixing temperature, °F | 240–280 | 275–280 |
| Mixing time, hours | 2.5 | 2.5 |
| Penetration, 100 g./5 sec./77° F.[a] | 88 | 88 |
| ASTM soft. point, R&B, °F.[b] | 120 | 121 |

[a] ASTM D 5-61.
[b] ASTM D 36-62T.

Each of these asphalt-rubber blends was made into a cationic asphalt-rubber emulsion. The results are shown hereinbelow.

| | 1 | 2 |
|---|---|---|
| Asphalt plus 2% Philprene 1502, percent | 51.0 | |
| Asphalt plus 2% Solprene 1204, percent | | 61.0 |
| Nalcamine CAE, percent | 0.42 | 0.34 |
| HCl, anhydrous, percent | 0.08 | 0.06 |
| CaCl$_2$, percent | 0.14 | 0.11 |
| Water, percent | 48.36 | 38.5 |
| pH of soap soln | 4.0 | 4.0 |
| Ashaplt, °F | 300 | 300 |
| Soap soln., °F | 120 | 120 |
| Stator-rotor, inches | [1] .040 | [1] .040 |
| Stability, 24 hours | Broken | Broken |

[1] Emulsion broke when setting was decreased below .040 inch.

These data indicate that stable cationic emulsions cannot be prepared from asphalt containing emulsion of solution-polymerized butadienestyrene random copolymers.

EXAMPLE III

A stable emulsion of a blend of 98 weight percent of 85/100 penetration asphalt and 2 percent solution polymerized 75–25 butadienestyrene block copolymer as described hereinabove, was heated to about 300° F. and added slowly to an acidified water solution of Nalcamine CAE cationic emulsifying agent in the charge tank of a Manton-Gaulin colloid mill. The following recipe was employed:

| | Parts by weight |
|---|---|
| Asphalt-rubber blend | 66.0 |
| Nalcamine CAE | 0.29 |
| HCl, anhydrous | 0.08 |
| CaCl$_2$ | 0.10 |
| Water | 33.53 |

The aqueous solutiton having a pH of 4.0 and maintained at a temperature of 90 to 120° F. was recirculated through the mill with an initial stator-rotor setting of 0.04 inch. After the addition of the asphalt-rubber blend, the stator-rotor setting of the mill was adjusted to 0.005 inch and the milling continued for three to four minutes. The resultant emulsion was homogeneous with no indications of breaking after standing for 24 hours.

The above results demonstrate that a stable, cationic asphalt-rubbery emulsion can be prepared from a rubbery block copolymer of a conjugated diene and vinyl-substituted aromatic compound even though the concentration of the cationic emulsifying agent is lower than that employed with either the emulsion-polymerized or the solution-polymerized random copolymer used in Example II. Also, the results show that the resultant emulsion was stable even though the concentratiton of asphalt was higher than that employed in the runs showed in Example II.

Various modifications and alterations of this invention will become apparent to those skilled in the art without departing from the scope and spirit of this invention, and it should be understood that within the scope of the appended claims, the invention may be practiced otherwise than is specifically discussed herein.

I claim:

1. A method for making a stable cationic rubber-asphalt emulsion comprising blending a solution-polymerized rubbery block copolymer having at least two polymeric blocks wherein one block of said copolymer is selected from a block polymer of at least one conjugated diene having from 4 to 12 carbon atoms per molecule and a random block polymer containing a major amount of said conjugated diene and a minor amount of a vinyl-substituted aromatic compound and the other block of said two distinct polymeric blocks is a homopolymer of said vinyl-substituted aromatic hydrocarbon, directly with asphalt to form a rubber-asphalt blend, the amount of said solution-polymerized rubbery block copolymer in said rubber-asphalt blend being from 0.1 to 15 weight percent, and thereafter admixing said rubber-asphalt blend with a soap solution comprising water and a cationic emulsifying agent to form said stable cationic rubber-asphalt emulsion wherein said rubber-asphalt blend comprises from 50 to 75 weight percent of said emulsion.

2. The method according to claim 1 wherein said soap solution comprises 25 to 50 weight percent water and 0.25 to 3.5 weight percent of a cationic emulsifying agent, both based on the total weight of said emulsion.

3. The method according to claim 2 wherein said conjugated diene is selected from the group consisting of 1,3-butadiene, 2-methyl-1,3-butadiene and 1,3-pentadiene and said aromatic compound is selected from the group consisting of styrene, divinylbenzene, 1-vinylnaphthalene, and 3-methyl styrene.

4. The method for making a stable cationic rubber-asphalt emulsion comprising blending a rubbery block copolymer of butadiene and styrene directly with asphalt to form a blend, the amount of said rubbery copolymer in said blend being from 0.1 to 15 weight percent, and thereafter admixing said blend with a soap solution comprising water and a cationic emulsifying agent to form an emulsion wherein said blend comprises from about 50 to about 75 weight percent of said emulsion, and wherein said soap solution comprises 25 to 50 weight percent water and 0.25 to 3.5 weight percent of said cationic emulsifying agent, both based on the total weight of said emulsion.

5. The method according to claim 4 wherein said cationic emulsifying agent is a mixture of 1-(2-aminoethyl)-2-n-heptadecenyl-2-imidazoline and 1-(2-aminoethyl)-2-n-heptadecadienyl-2-imidazoline.

6. The method according to claim 4 wherein said block copolymer of butadiene and styrene is comprised of two blocks, one block being a copolymer of butadiene and styrene and the other block being polystyrene with the polystyrene block comprising at least 5 weight percent of said block copolymer.

7. The method according to claim 6 wherein said block copolymer is formed from a monomeric mixture comprising 75 parts by weight butadiene and 25 parts by weight styrene.

8. The method according to claim 1 wherein said concentration of cationic emulsifying agent is 0.9 to 2.5 weight percent based on the total weight of said emulsion.

9. The method according to claim 4 wherein said block copolymer of butadiene and styrene comprises two blocks, one block comprising polybutadiene and the other block comprising polystyrene, the polystyrene block comprising at least 5 weight percent of said block copolymer.

References Cited

UNITED STATES PATENTS

| 3,097,179 | 7/1963 | Ceintrey | 260—28.5B |
| 3,238,173 | 5/1966 | Bailey | 260—28.5B |
| 3,265,765 | 8/1966 | Holden | 260—28.5B |

MORRIS LIEBMAN, Primary Examiner

S. L. FOX, Assistant Examiner

U.S. Cl. X.R.

260—29.7, 34.2